United States Patent [19]
Taniuchi et al.

[11] Patent Number: 5,971,574
[45] Date of Patent: Oct. 26, 1999

[54] AUTOMOBILE HEADLIGHT

[75] Inventors: Hitoshi Taniuchi; Hiroshi Iwasaki; Takashi Futami, all of Tokyo, Japan

[73] Assignee: Stanley Electric Co., Ltd, Tokyo, Japan

[21] Appl. No.: 08/932,587

[22] Filed: Sep. 17, 1997

[30] Foreign Application Priority Data

Sep. 20, 1996 [JP] Japan .................................. 8-250177

[51] Int. Cl.$^6$ .................................................. B60Q 1/06
[52] U.S. Cl. ......................... 362/508; 362/286; 362/287
[58] Field of Search .................................. 362/508, 285, 362/286, 287

[56] References Cited

U.S. PATENT DOCUMENTS 5,047,902  9/1991  Neumann et al. ...................... 362/508
5,122,935  6/1992  Peterson ................................. 362/508

FOREIGN PATENT DOCUMENTS

4435507 A1  4/1996  Germany .
8-111101    4/1996  Japan .

Primary Examiner—Stephen Husar
Attorney, Agent, or Firm—Morgan, Lewis & Bockius LLP

[57] ABSTRACT

An automobile headlight including a single movable light source which does not change the angle of its optical axis relative to the optical axis of the reflector. The light source is coupled to an apparatus capable of changing the position of the light source depending on the driving state of the automobile. The headlight has sufficient light distribution patterns for multiple driving conditions, such as when the automobile is traveling straight ahead, by-passing another vehicle, or carrying a heavy load, without changing the angle of the optical axis of the light source relative to the optical axis of the reflector. This allows the driver to maintain good visibility while prolonging the life of the headlight and reducing its overall size.

18 Claims, 4 Drawing Sheets

AUTOMOBILE HEADLIGHT

This application claims the benefit of Japanese Patent Application No. HEI 08-250177, filed Sep. 20, 1996, which is hereby incorporated by reference.

BACKGROUND OF THE INVENTION

1. Field of the Invention

The present invention relates to a headlight for an automobile and more particularly to a headlight utilizing a single movable light source capable of changing its light distribution pattern to conform with any illumination guidelines governing the situations wherein the automobile is traveling straight ahead or by-passing another vehicle. This invention can also be employed to dim the headlights from its high-beam operation to accommodate the approach of on-coming vehicles. A headlight according to the present invention is particularly suited for those headlights utilizing a metal halide lamp, which because of their construction cannot be positioned close together and, therefore, are unable to comply with the above described situations separately.

2. Discussion of the Related Art

Japanese Patent Application HEI 08-111101 discloses a conventional headlight. The light source is coupled to and is supported by a rotatable vertical lever. When an automobile by-passing another vehicle, a lever rotates backward by a predetermined angle around the rotary axis on the upper part of the lever and the light source is moved concurrently backward and downward.

However, as depicted in FIG. 6, when the automobile with the above described headlight is traveling straight ahead, the optical axis X of the light source 90 tilts downward by degree alpha relative to the optical axis Z of the reflector 91. Accordingly, the arc 90a of the light emitted from the light source 90 also tilts and modifies the light distribution pattern that gives rise to the following problems. Firstly, it is difficult to have a light distribution pattern sufficient for both situations, when the automobile is traveling straight ahead and when the automobile is by-passing another vehicle. Secondly, it is difficult to satisfy any potential headlight operational guidelines, when a metal halide lamp is used as a light source, because the optical axis X of the light source 90 when the automobile is traveling straight ahead has to be positioned so that the light source 90 is tilted 10 degrees or less from the optical axis of the reflector. If the optical axis X tilts more than 10 degrees, it is prone to shorten the life of the automobile headlight. Additionally, an automobile headlight having a metal halide lamp as a light source is required to have means for adjusting excessive brightness in the forward and upward directions, when the automobile is carrying a heavy load, and this is accomplished by tilting the optical axis X of the light source 90 upward. Thirdly, the use of the rotatable lever substantially increases the size of the headlight, because the lever has to be long enough to satisfy any operational guidelines such as, a requirement that the optical axis X of the light source 90 is required to move backward from 3 to 5 millimeters and downward from 0.5 to 1.5 millimeters.

SUMMARY OF THE INVENTION

The present invention is directed to an automobile headlight with one light source, and the like, that substantially obviates one or more of the above problems due to the limitations and disadvantages of the related art.

An object of the invention is to provide an illumination system that has sufficient light distribution patterns for different operational situations, without changing the angle of the optical axis of the light source relative to the optical axis of the reflector, and allowing the driver to maintain good visibility.

Another object of the invention is to prolong the life of the single movable headlight by preventing the optical axis angle of the light source from changing relative to the optical axis of the reflector.

A still further object of the invention is to reduce the size of the headlight by using a mechanism that allows the light distribution pattern to concurrently satisfy at least two operational guidelines.

According to the invention, the above objects are achieved by providing an automobile headlight including a movable light source which does not change the angle of its optical axis relative to the optical axis of the reflector. The light source is coupled to a driving unit capable of changing the position of the light source as the driver maneuvers the automobile.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION OF THE PREFERRED EMBODIMENTS

Figure 1:
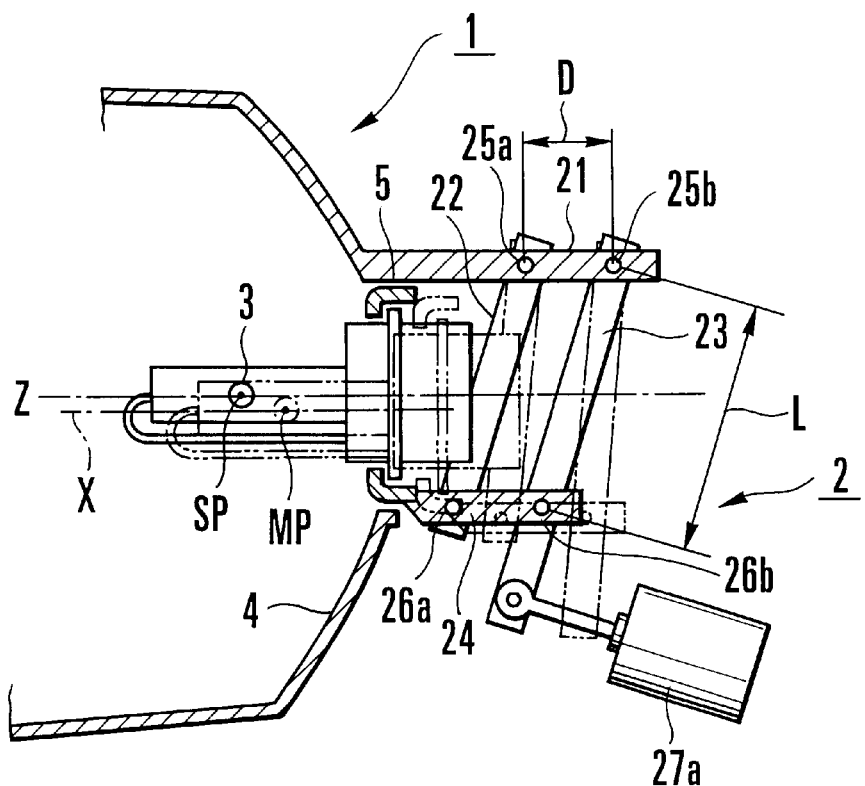
FIG. 1 is a cross sectional view of the first preferred embodiment of the present invention.

The preferred embodiments of the present invention will be described with reference to the drawings. FIG. 1 illustrates the automobile headlight 1 according to the first embodiment of the present invention. The automobile headlight 1 includes a single light source 3 and a driving unit 2 for changing the position of the light source 3, as a driver maneuvers the automobile. The light source 3 may occupy at least two positions. MP depicts the position of the light source when the automobile is traveling straight ahead. SP depicts the position of the light source when the automobile is by-passing another vehicle.

The driving unit 2 includes a fixed supporting arm 21, a pair of movable arms 22 and 23, which are substantially parallel to each other, a socket mounting arm 24 substantially parallel to the fixed supporting arm 21, an actuator 27a to move the arms 22, 23, and the socket mounting arm 24.

The fixed supporting arm 21 is coupled to the reflector 4 and is substantially parallel to the optical axis Z of the reflector 4. The arms 22 and 23 are pivotally joined at their ends by rivets 25a, 25b, 26a, and 26b. The arm 23 is connected to the actuator 27a utilizing a solenoid or the like. The arms 22 and 23 are capable of smoothly moving together forwardly and backwardly in a diagonal direction by the operation of the actuator 27a. The socket mounting arm 24 moves with the arms 22 and 23 and is substantially parallel to the optical axis Z of the reflector 4. The distances D, between rivets 25a and 25b, and L, between rivets 25b and 26b, are stable.

A socket 5 is mounted on the socket mounting arm 24 such that the optical axis X of the light source 3 is substantially parallel to the fixed supporting arm 21. Accordingly, the light source 3 moves together and is substantially parallel to the optical axis Z of the reflector 4 when the arms 22 and 23 move forwardly and backwardly in a diagonal direction. The locus of the light source 3 navigates a circular arc with a radius L, the distance between the rivets 25b and 26b.

The position of the rivet 25a is determined by adjusting the stroke of the actuator 27a such that the light source 3, mounted on the socket 5, moves between the positions SP and MP, reflecting, respectively, the positions of the light source 3 when the automobile is by-passing another vehicle and traveling straight ahead.

Figure 5A:
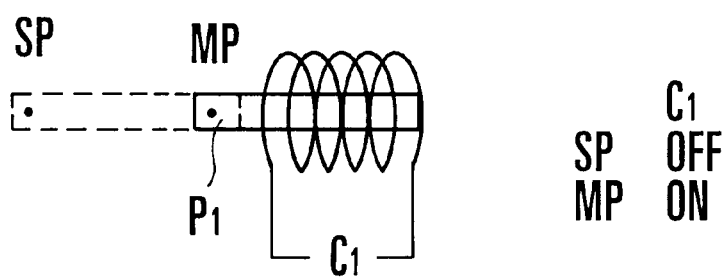
FIG. 5A is a diagram of an actuator used in the first and second preferred embodiments of the present invention.

FIG. 5A illustrates schematically a portion of the actuator 27a and its basic operation. The actuator 27a includes a coil C1 and a plunger P1. The plunger P1 moves smoothly into or out of the coil C1, as a single light source of the headlight changes its position. When the light source 3 moves to the SP position, a voltage applied to the coil C1 becomes 0 volts, and the plunger P1 is induced to extend a distance outside of the coil C1. When the light source 3 is in the MP position, the plunger P1 is substantially within the coil C1.

The operational advantages of the automobile headlight 1 according to the preferred embodiment of the invention will now be described. Firstly, since the optical axis X of the light source 3 does not tilt when the position of the light source is changed, the light source 3 moves from position SP to MP smoothly while maintaining a substantially parallel relationship to the optical axis Z of the reflector 4 conforming to the light distribution patterns for both automobile operating situations as required by operational guidelines. As a consequence, it can provide the driver with good visibility. Secondly, the driving unit makes it possible to satisfy the condition that the tilted angle of the optical axis of the light source is less than 10 degrees relative to the optical axis of the reflector, when a metal halide lamp is used as a light source. In addition to the above enumerated advantages, the life of the headlight is also prolonged.

Figure 2:
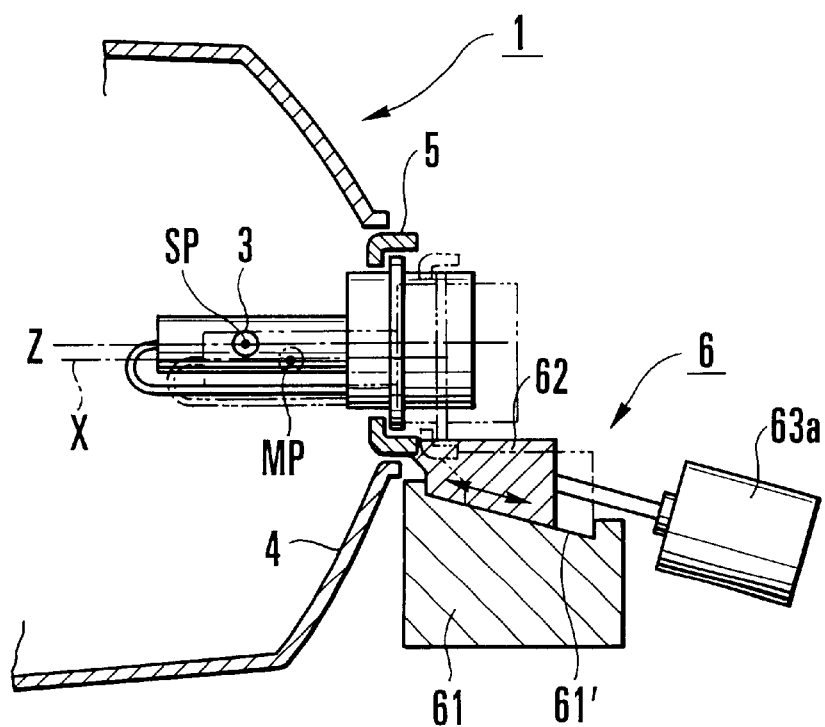
FIG. 2 is a cross sectional view of the second embodiment of the present invention.

FIG. 2 illustrates a portion of a second embodiment of the present invention. In this embodiment, the driving unit 6 for changing the position of the light source includes a slide 61, a slider 62 on which a socket is mounted, and an actuator 63a capable of pushing and pulling the slider 62. The slider 62 moves on a slope 61' forwardly and backwardly in a diagonal direction by the operation of the actuator 63a. The slope 61' has the same length as, and is parallel to, the line drawn between the positions MP and SP of the light source 3. The optical axis X of the light source 3 is parallel to the optical axis Z of the reflector 4. Accordingly, the light source mounted on the socket 5 is coupled to the slider 62, moves smoothly forwardly and backwardly in a diagonal direction along the slope 61' and remains substantially parallel to the optical axis Z of the reflector 4, as a driver maneuvers the automobile, while conforming to the light distribution patterns as required by operational guidelines for the situation that the automobile is either traveling straight ahead or by-passing another vehicle. The composition and operation of the actuator 63a is the same as that of the actuator 27a.

When a metal halide lamp is used as a light source, the light source may additionally have a position for the situation wherein the automobile is carrying a heavy load.

Figure 3:
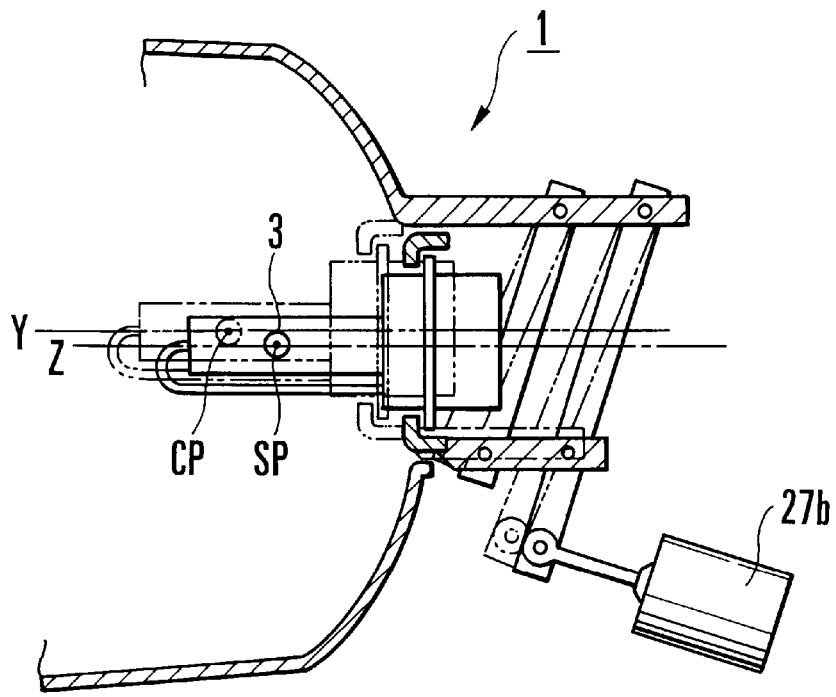
FIG. 3 is a cross sectional view of the third preferred embodiment of the present invention showing positions of a light source when an automobile is by-passing another vehicle and carrying a heavy load.

FIG. 3 illustrates a portion of the third embodiment of the present invention when the automobile is carrying a heavy load and by-passing another vehicle. SP in FIG. 3 corresponds to SP in FIG. 1. In this embodiment, the light source 3 is capable of having three positions depending on the situation whether the automobile is traveling straight, by-passing another vehicle, or carrying a heavy load. CP depicts the position of the light source when the automobile is carrying a heavy load. Since the CP position is above and more forward than the SP and MP positions, the light distribution of the headlight becomes sufficiently low enough to meet the operational guidelines for the situation of when an automobile is carrying a heavy load.

Figure 4:
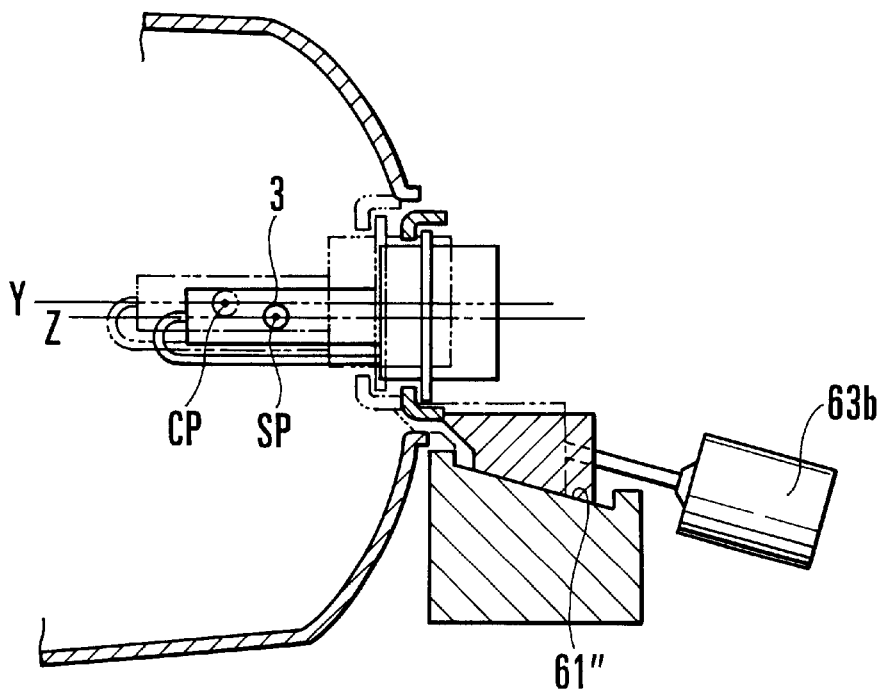
FIG. 4 is a cross sectional view of the forth preferred embodiment of the present invention showing positions of a light source when an automobile is by-passing another vehicle and carrying a heavy load.

FIG. 4 illustrates a portion of the forth embodiment of the present invention when the automobile is carrying a heavy load and by-passing another vehicle. SP in FIG. 4 corresponds to SP in FIG. 2. This embodiment is also capable of having three positions for the light source depending on the situation whether the automobile is traveling straight, by-passing another vehicle, or carrying a heavy load.

In this embodiment, a length of a slope 61" is longer than the slope 61' of the second embodiment so that the single light source 3 travels the additional distance necessary, between the CP and MP positions, to satisfy the operational guidelines.

Figure 5B:
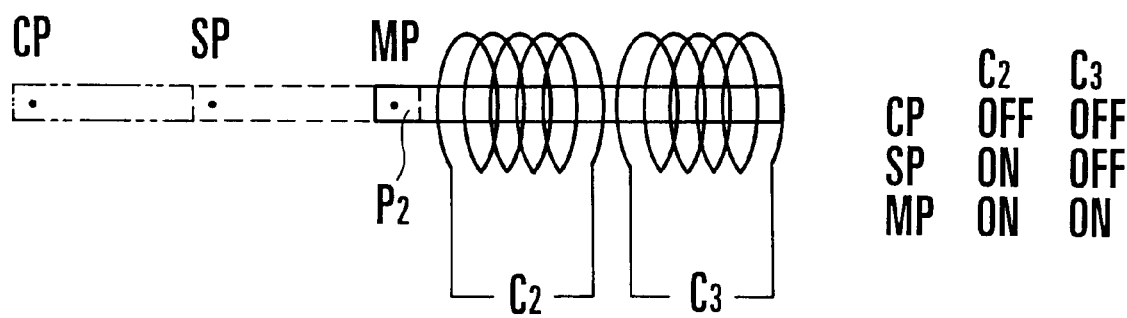
FIG. 5B is a diagram of an actuator used in the third and forth preferred embodiments of the present invention.
Figure 6:
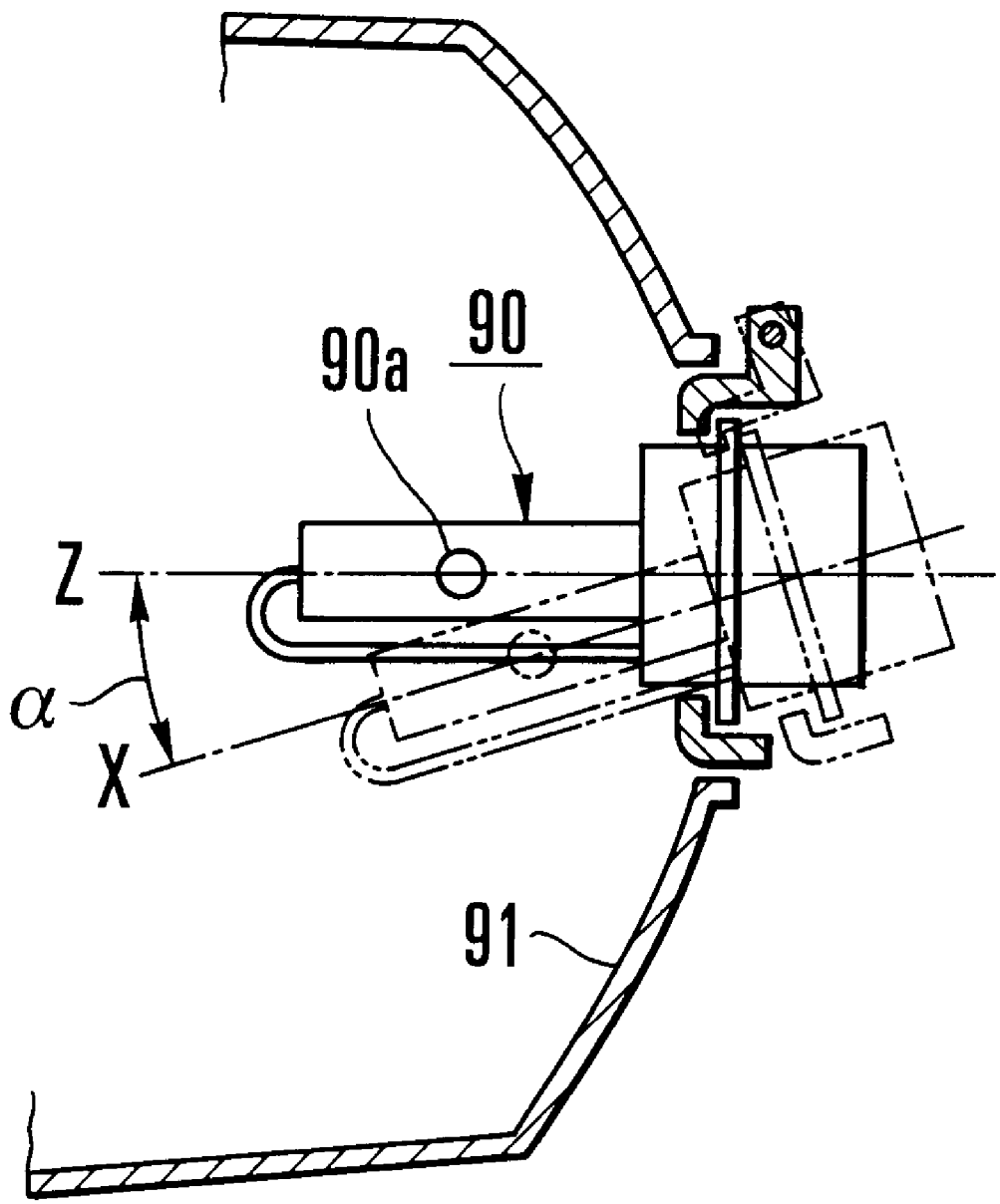
FIG. 6 is a cross sectional view of an embodiment of the prior art.

FIG. 5B illustrates schematically a portion of actuators 27b and 63b and their basic operation of the third and forth embodiments of the present invention. The actuators 27b and 63b, depicted in FIGS. 3 and 4 respectively, includes, respectively, two coils C2 and C3, and a plunger P2. The plunger P2 moves smoothly into or out of the coils C2 and C3 as the single light source of the headlight changes its position. When the light source 3 is in the SP position, the plunger P2 is outside of coil C3 and substantially within coil C2. When the light source 3 is in the MP position, the plunger P2 is substantially within the coils C2 and C3. When the light source is in the CP position, the plunger P2 is outside of coil C3 and extends substantially from coil C2.

The coils C2 and C3 are connected to a sensor for detecting the tilt of an automobile body, such combination is well known and is not depicted in FIG. 5B. The plunger P2 moves into and out of the coils C2 and C3 depending on a voltage applied to the coils C2 and C3 in accordance with a signal from the sensor for detecting tilt of an automobile body. When the voltage applied to the coils C2 and C3 becomes 0 volts, the plunger P2 and light source 3 move to their CP position.

It will be apparent to those skilled in the art that various modifications and variations can be made in the automobile headlight of the present invention without departing from the spirit or scope of the invention. It is intended that the present invention cover the modifications and variations of this invention provided they come within the scope and spirit of the appended claims and their equivalents.

What is claimed is:

1. An automobile headlight comprising;

a reflector having an optical axis;

a socket for receiving a light source;

a light source having an optical axis disposed at a predetermined angle with respect to the optical axis of the reflector; the light source being coupled to the socket and being capable of movement between each of at least two light source positions while maintaining the predetermined angle between the optical axis of the reflector and the optical axis of the light source; and a driving unit capable of moving the light source between each of the at least two light source positions.

2. The apparatus of claim 1, wherein the driving unit comprises:

a fixed supporting arm coupled to the reflector;

a socket mounting arm coupled to the socket;

first and second movable arms capable of pushing and pulling the socket mounting arm to facilitate movement of the socket between each of the at least two positions of the light source;

an actuator; and a connector pivotally coupling the movable arms, the actuator being coupled to at least one of the first and second movable arms.

3. The apparatus of claim 1, wherein the driving unit comprises:

a slide positioned adjacent to the reflector;

a slider movably positioned on the slide and coupled to the socket; and an actuator coupled to the slider for reciprocatingly moving the slider on the slide.

4. The apparatus of claim 3, wherein the actuator is a solenoid.

5. The apparatus of claim 4, wherein the solenoid comprises:

at least two coils; and a plunger capable of moving smoothly into or out of each of the at least two coils.

6. The apparatus of claim 5, wherein the plunger is capable of moving between each of the at least two positions of the light source.

7. The apparatus of claim 3, wherein the slide is inclined and the slider moves smoothly along the incline of the slide, forwardly and backwardly in a diagonal direction by the operation of the actuator.

8. The apparatus of claim 2, wherein the actuator is a solenoid.

9. The apparatus of claim 8, wherein the solenoid comprises:

a coil; and a plunger capable of moving smoothly into or out of the coil.

10. The apparatus of claim 9, wherein the plunger is capable of moving between each of the at least two positions of the light source.

11. The apparatus of claim 2, wherein the first and second movable arms move smoothly forwardly and backwardly in a diagonal direction maintaining a fixed distance between the pivotally coupled arms during the operation of the actuator.

12. The apparatus of claim 11, wherein the first and second movable arms move smoothly forwardly and backwardly in a diagonal direction while maintaining a substantially parallel relationship to the optical axis of the reflector when driven by the actuator.

13. The apparatus of claim 2, wherein the fixed supporting arm and the socket mounting arm are substantially parallel to the optical axis of the reflector.

14. The apparatus of claim 2, wherein the first and second movable arms are substantially parallel to each other.

15. The apparatus of claim 2, wherein the fixed supporting arm is coupled to at least one of the first and second movable arms and the socket mounting arm is coupled to at least one of an opposing end of the first and second movable arms.

16. The apparatus of claim 1, wherein the optical axis of the movable light source is substantially parallel to the optical axis of the reflector.

17. The apparatus of claim 1, wherein the predetermined angle between the optical axis of the reflector and the optical axis of the light source is less than 10 degrees.

18. The apparatus of claim 1, wherein the movable light source is capable of moving forwardly and backwardly in a diagonal direction while maintaining an angular relation between the optical axis of the light source and the optical axis of the reflector.

* * * * *